United States Patent
Breitenbach

[11] 4,314,168
[45] Feb. 2, 1982

[54] PREFABRICATED STATOR WINDINGS

[75] Inventor: Otto Breitenbach, Nuremberg, Fed. Rep. of Germany

[73] Assignee: Kabel-Und Metallwerke Gutehoffnungshuette A.G., Hannover, Fed. Rep. of Germany

[21] Appl. No.: 151,658

[22] Filed: May 20, 1980

[30] Foreign Application Priority Data

May 21, 1979 [DE] Fed. Rep. of Germany ....... 2920477

[51] Int. Cl.³ .......................................... H02K 41/02
[52] U.S. Cl. ................................... 310/13; 174/65R; 310/214
[58] Field of Search .................................. 310/12–14, 310/214, 215; 174/60 R, 65 G

[56] References Cited

U.S. PATENT DOCUMENTS

| 1,754,685 | 4/1930 | Kauter | 310/13 |
| 2,701,316 | 2/1955 | Willits et al. | 310/214 |
| 3,229,026 | 1/1966 | Sulzer | 174/65 G |
| 3,334,255 | 8/1967 | Peters | 310/214 X |
| 4,147,946 | 4/1979 | Linscott, Jr. et al. | 310/214 |

*Primary Examiner*—Donovan F. Duggan
*Attorney, Agent, or Firm*—Smyth, Pavitt, Siegemund & Martella

[57] ABSTRACT

Individual cables are provided with lateral ridges to be snapped behind noses of cutouts in rails by means of which the winding is assembled and retained. The rope-ladder-like assembly is installed by placing the cable portions, resembling the rungs, into grooves of the stator core, also having noses behind which the cable ridges are lodged.

6 Claims, 3 Drawing Figures

PREFABRICATED STATOR WINDINGS

BACKGROUND OF THE INVENTION

The present invention relates to prefabrication of a multiphase a.c. winding for a linear motor. More particularly, the invention relates to three-phase windings for such motors, to be prefabricated for placement into the stator core of the motor as a coherent, uniform assembly.

The linear motor of the type to which the invention pertains is comprised of a long stator, cooperating with a movable armature and being comprised of a core having grooves for receiving the stator winding. It has been suggested to construct the stator windings as a coherent assembly of three cables; see, for example, U.S. Pat. No. 4,246,694 (German printed patent Application No. 27,21,905). The invention relates particularly to improvements in the prefabricated structure of such windings.

Linear motors are well known in the art. These motors are constructed as d.c. or a.c. motors, the latter being either of the asynchronous or of the synchronous type. In other words, the various dynamic principles and practices employed for and in rotary motors have been adapted to linear-motor-type structures. The stator defines, so to speak, a linear track path, and electrical energy is transmitted from that track to a mobile armature running along the track.

The stator of a linear motor is an inductor, having a core which is provided with parallel grooves; the windings are placed into the grooves, e.g., in a three-phase-type pattern. The armature may be composed of a simple, relatively short rail or section made of electrically conductive material such as copper or aluminum. This kind of armature completes an asynchronous motor. In the case of a synchronous motor, the armature is made of permanent magnetic material.

It should be noted that linear motors are known, in which the energizing coil is mounted in the armature. However, at present we are concerned only with motors, in which the stator is to be provided with windings. Broadly speaking, though, the inventive principle may be applied to any long portion, be it the armature or the stator, of a linear motor.

Linear motors can be used in many different fields of application. They can be used for transportation of people, freight, or both; for conveyors and baggage handling systems; in mining, for dredging, or in cranes. Smaller motors may be used to drive machine tool carriages or slides, or the like. By and large, the borderline between a solenoid and a linear motor is not well defined. The invention is also applicable to the former; but long, linear motor assemblies are the preferred area of application and use because simplifying the manufacture of a long stator is a rather pressing problem. It is quite clear that a long stator requires extensive installation work, in particular, the placement of the windings; and even small savings on a per-meter basis may amount to considerable overall savings.

In order to simplify installation, it has been suggested to prefabricate the windings as a coherent assembly; see German Patent Application DAS No. 27,21,905, corresponding to U.S. Pat. No. 4,246,694. In this particular assembly, emphasis is placed upon directly fastening the cable to each other. Also, covering the cable in grooves of the stator core is suggested in this reference. The particular prefabrication method as disclosed therein is, indeed, very practical because it permits, in fact, the prefabrication of long windings. However, the placing of individual cable portions and their positive positioning in the stator core grooves still requires rather extensive manipulation.

DESCRIPTION OF THE INVENTION

It is an object of the present invention to improve prefabrication of the windings for the stator in a linear motor.

It is a particular object of the present invention to provide a new and improved assembly of cables, constituting the stator winding of a linear motor and being constructed to facilitate placement and positive positioning of the winding in grooves of the stator core.

It is another object of the present invention to improve the stator construction for a linear motor.

It is a further object of the present invention to provide a new cable for use in a stator winding for a linear motor.

In accordance with a feature of the present invention, the cable or cables to be used in a stator winding assembly in a linear motor are to be provided with a jacket having laterally extending, resiliently bendable ridges. These ridges are provided to snap behind suitable undercuts and noses. The term "laterally extending" is to mean, preferably radially but with a circumferential component which, for example with regard to two ridges, is to mean: toward each other.

As far as preassembly of the stator winding is concerned, the ridges snap behind noses of cutouts in two rails by means of which the cables are assembled in ladder-like fashion. The cables are placed in a meandering pattern and their ridges rest behind the noses in the cutouts. This way, cables and rails are held together as a unitary, coherent assembly.

Analogously, the core of the stator has undercut grooves. As the cables are pressed into the grooves, the ridges lodge behind the undercut portions. The undercut portions are established by noses which narrow the passage to some extent into the respective groove, but the ridges will yield resiliently; and after passage through the narrow portion of the noses, they snap into position behind them. Thus, placement of the cables into their proper position requires only the simple manipulation of pressing them into the respective groove or cutout. Preassembly of the stator winding and the completion of the stator assembly by in situ combining the cable assembly and the stator core requires just the simple manipulation of pressing the cable in place. The resilient ridges will readily yield until snapped in position.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which

Figure 1:
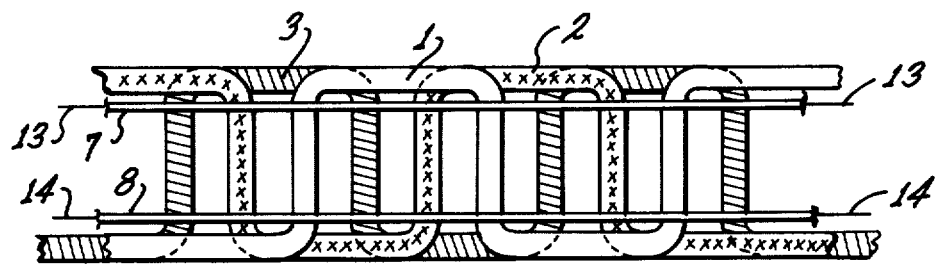
FIG. 1 is a schematic top view of a prefabricated stator winding in accordance with the preferred embodiment of the present invention, constituting the best mode of practicing same.

Proceeding now to the detailed description of the drawings, the figures show three cables 1, 2, and 3, each including at least one conductor, possibly a bundle of insulated conductors or wires. These cables are identified in the drawings by markings such as crosses and rings. These identifying markings are shown here for the purpose of facilitating tracing the individual cables. In reality, there may be markings such as a color code, etc., for identifying each of the phases of this three-phase, three-cable assembly.

Figure 2:
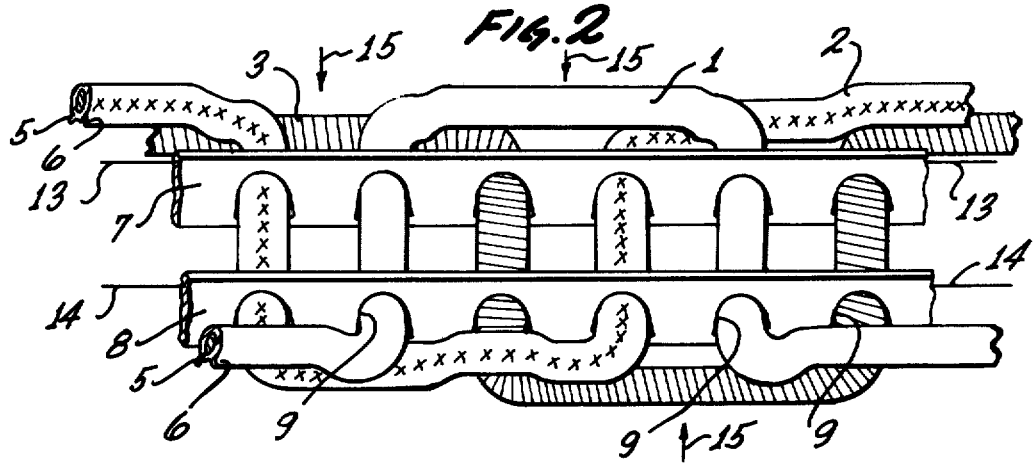
FIG. 2 is a perspective view of the winding shown in FIG. 1.

FIGS. 1 and 2 illustrate primarily the meandering pattern of each cable, and the superposed relationship of all three cables in the assembly. The meandering pattern of each cable is established by placing the cable into cutouts 9 of rails 7 and 8. The cutouts of these rails are aligned as the rails extend parallel to each other. Moreover, each cable is placed into cutouts, separated respectively by two cutouts, each of which receiving one of the two respective other cables. Thus, the space between the two rails 7 and 8 is occupied in part by sections of the cables arranged like the rungs of a ladder. These "rungs" are placed into the grooves of the stator core (10, FIG. 3) of the linear motor.

Figure 3:
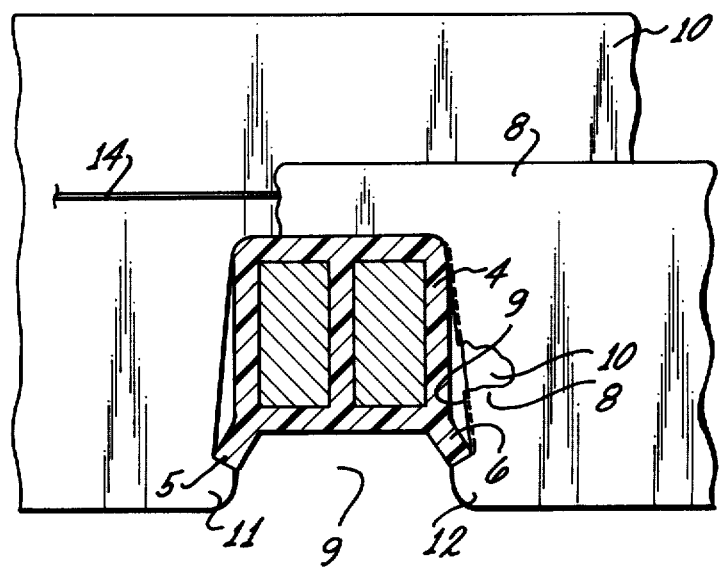
FIG. 3 is a section view of a modified detail of the winding shown in FIGS. 1 and 2, drawn to a larger scale, and showing additionally the stator core.

Turning now to details, each cable is provided with a particular outer jacket 4, made of insulating material. FIG. 2 shows the cable to have a simple, round cross section. However, the grooves of the stator core may be of a rectangular cross section. In that case, a corresponding cable and cable jacket profile is desirable. FIG. 3 shows the cross section of such a cable; its jacket 4 has a particular cross-sectional profile.; it is almost square-shaped with two conductors of a rectangular cross section. The overall shape corresponds to the shape of the grooves in stator core 10 into which the "rungs" are placed.

The jacket 4, regardless of its profile, is provided with longitudinal ridges 5 and 6 which extend, to some degree, radially outwardly. Each cutout 9 is provided with two noses, such as nose 12, and the ridges 5 and 6 snap behind these noses when the cable is inserted into the particular cutout. The ridges should resiliently react so that the cable portion is firmly held in its respective cutout. This way, the cable is actually retained therein. Due to the fact that each cable is placed in a meandering pattern and in many cutouts of each rail, a coherent assembly is, indeed, established. It may be convenient to put a spot of an adhesive at the engaging portions of cutouts and ridges, to add some bonding force to the resilient retention force. Alternatively, one may weld the ridges and cutout noses together by ultrasonics. This supplemental bonding may not necessarily involve each point of engagement, but only some noses and portions of the ridges.

The grooves of the stator core have similarly shaped noses (11) behind which the ridges (5 and 6) are lodged when the cable portions of the "rungs" are forced into the stator core. The illustrated nose 11 of core 10 is actually behind the respective other nose 12 of the illustrated cutout in rail 8 of FIG. 3, while an analogous nose 11 of core 10 is behind and in line with the illustrated nose 12 of rail 8.

The jacket 4 is preferably made of polyvinyl chloride; but but one may use other materials such as polyethylene, polyurethane, polypropylene, or rubber. Any of these materials is sufficiently resilient, so that the ridges will resiliently react and be held against the noses 11 and 12. It was found that this construction suffices to hold the cables and rails together in a uniform configuration and assembly, resembling a rope ladder but being placeable rung by rung into the grooves of stator core 10. The cables do not have to have quadrilateral cross sections; but one could use a bundle of round conductors with an overall, enveloping jacket having the illustrated cross section.

The cutouts 9 should have a slightly smaller cross section than the inner cross-sectional dimensions of the grooves in the stator so that the cable "rungs" are not damaged by any sharp edges of the stator core. However, the cable will not sit loosely in these core grooves because the ridges snap behind the noses (11) of the core grooves. Basically, one can say, however, that the cutouts of rails 7 and 8 should resemble the cross section of the grooves in the stator core; they all are to be provided with some means behind which the ridges can lodge upon pressing the cable into the groove-cutout.

The rails 7 and 8 are preferably made of a suitable plastic or synthetic material such as polyvinyl chloride or polyethylene. They must be quite strong but bendable, because the cable-plus-rail assembly should be flexible so that it may be wound onto a drum. Tensile strength may be enhanced by including strong strings 13 and 14 which have the requisite tensile strength.

The arrows 15 point to locations of the rails which, in fact, have been partially or completely cut (except for strings 13 and 14) after the cables have been assembled. The rails will then be cut into sections of two cutouts each. The assembly will not come apart, but remain uniform. Moreover, it will be made easier to now wind the assembly on a drum and to haul it to the site where a track of stator core elements has been assembled and placed, in order to complete the stator assembly, by simply unrolling the winding from the drum and pressing the "rungs" into the core grooves, one after the other, whereby the resilient ridges yield readily when a cable portion is pressed through the narrowed opening on account of the protruding noses, such as nose 11.

The assembly is not only held together as a coherent element by means of rails 7 and 8, before and after installation, but the rung portions are spaced in a manner corresponding exactly to the groove spacing of stator core 10 of the linear motor.

The invention is not limited to the embodiments described above; but all changes and modifications thereof, not constituting departures from the spirit and scope of the invention, are intended to be included.

I claim:

1. A multiphase winding for the stator of a linear motor, assembled by placing several cables in a meandering pattern in which portions of the cable are arranged in parallel and ladder rung-like fashion, the improvement of a jacket for each cable, having each two laterally extending, resiliently bendable ridges.

2. A winding as in claim 1, including a pair of rails with cutouts, the cables being placed into the cutouts of the rails, the cutouts having noses behind which the ridges are lodged.

3. A stator for linear motor, including a core having a plurality of parallel grooves with undercut portions and a plurality of cables meander-like placed into the grooves, the cables having each longitudinal, resiliently bendable ridges, resiliently resting and being held behind the undercut portions of the grooves.

4. A winding as in claim 1, 2, or 3, the ridges extending each for the length of the respective cable.

5. A stator as in claim 3, wherein the cables are combined in a coherent assembly by means of two parallel rails, having cutouts with noses behind which the ridges rest to, thereby, structurally combine the cables and the rails.

6. A cable for use in a stator winding in a linear motor, the stator having a core with undercut grooves, the cable having an insulation jacket, the jacket having laterally extending ridges for placement behind the undercut grooves.

* * * * *